United States Patent [19]

Duke

[11] Patent Number: 5,251,414
[45] Date of Patent: Oct. 12, 1993

[54] ENERGY ABSORBING COMPOSITE AND REINFORCING CORE

[76] Inventor: Darryl A. Duke, 8876 Tackles, Pontiac, Mich. 48054

[21] Appl. No.: 851,603

[22] Filed: Mar. 16, 1992

[51] Int. Cl.$^5$ .............................................. E04C 2/32
[52] U.S. Cl. .................................. 52/309.16; 52/452; 52/454; 52/630; 428/178
[58] Field of Search .................. 52/309.7, 309.16, 335, 52/336, 337, 340, 450, 451, 452, 454, 630; 428/178, 313.3, 402

[56] References Cited

U.S. PATENT DOCUMENTS

| | | | |
|---|---|---|---|
| 3,546,055 | 12/1970 | Spertus | 428/402 |
| 3,741,411 | 6/1973 | Peacock | 214/10.5 R |
| 4,034,137 | 7/1977 | Hofer | 428/308 |
| 4,101,704 | 7/1978 | Hiles | 428/218 |
| 4,250,136 | 2/1981 | Rex | 264/257 |
| 4,545,172 | 10/1985 | Wardill | 52/795 |
| 4,673,605 | 6/1987 | Sias et al. | 428/120 |
| 4,818,583 | 4/1989 | Geel | 428/195 |
| 4,830,908 | 5/1989 | Nakajima et al. | 428/246 |
| 4,877,671 | 10/1989 | Stagg et al. | 428/139 |
| 5,100,730 | 3/1992 | Lambers | 428/402 |

Primary Examiner—Carl D. Friedman
Assistant Examiner—Matthew E. Leno
Attorney, Agent, or Firm—Andrew E. Pierce

[57] ABSTRACT

A reinforcing structure useful in the formation of an energy absorbing composite suitable for use as a motor vehicle body panel which resists deformation upon absorbing impact loads by distribution of a deforming load to areas of the composite surrounding the area of impact. The composite has a plurality of particulate, reinforcing members in a polymer matrix and at least one undulating, reinforcing, sheet member as a reinforcing structure between the external walls of the composite. The load distributing, particulate, reinforcing members and the undulating, reinforcing, sheet member components are retained in a thermoplastic or thermosetting resin matrix. Preferably, the load distributing components include at least one undulating, reinforcing sheet which is formed on a molding means having a first and second series of intersecting parallel axes so as to form an undulating sheet having alternating troughs and crests.

15 Claims, 2 Drawing Sheets

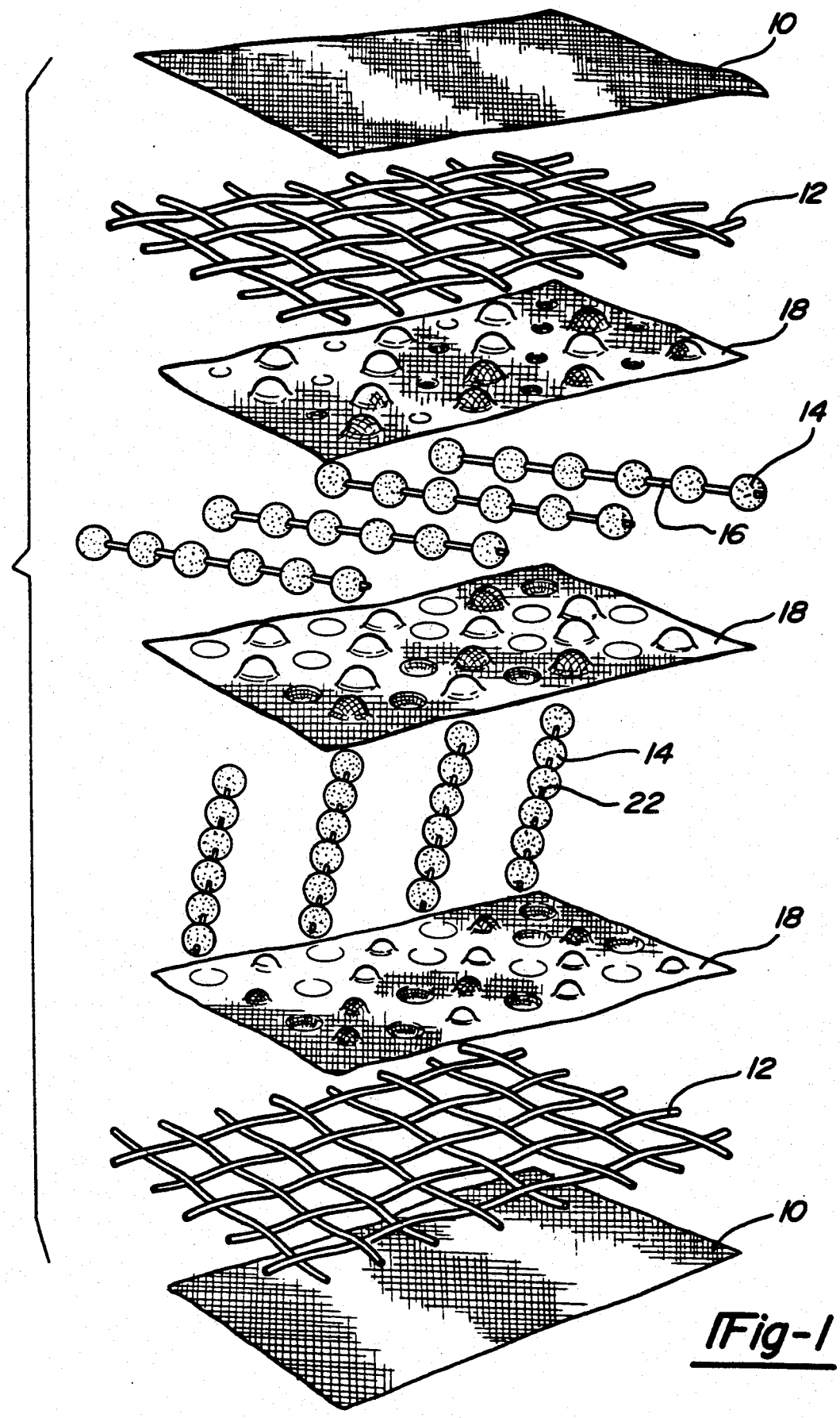

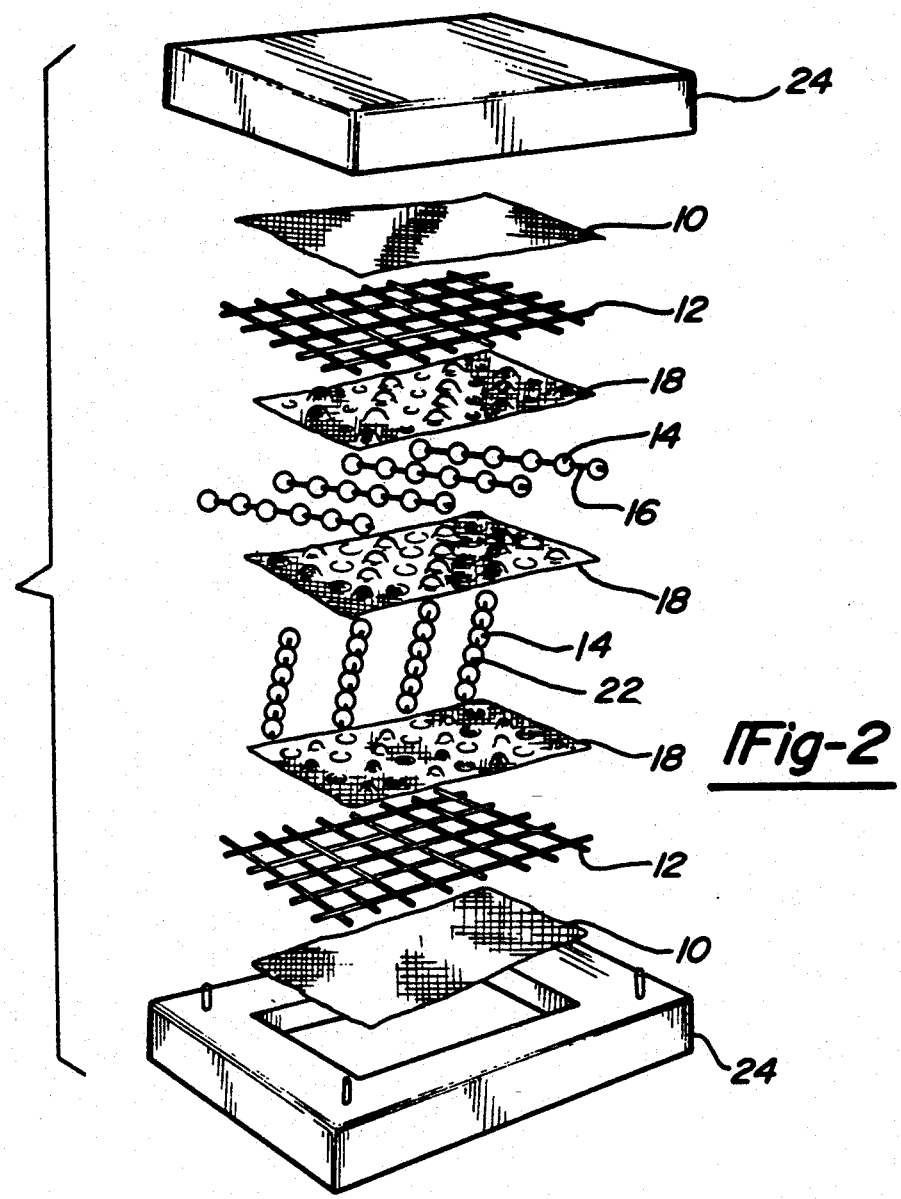
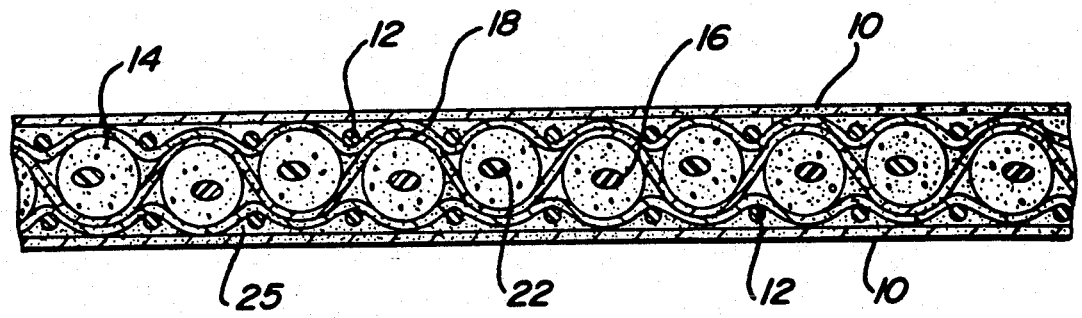

ENERGY ABSORBING COMPOSITE AND REINFORCING CORE

BACKGROUND OF THE INVENTION

1. Field of the Invention

This invention relates to energy absorbing composites suitable to replace steel panels, for instance, in automobile construction and reinforcing members useful as a reinforcing core therein.

2. Description of the Prior Art

Lightening the weight of automotive vehicles is desirable from the standpoint of increasing the efficiency with a resulting savings of energy. Weight lightening can be accomplished by reducing the thickness of metallic vehicle outer panels or by decreasing the number and thickness of structural members. However, this unavoidably lowers the strength of various component parts and causes a reduction in rigidity of an outer body panel, particularly in the case of an automobile vehicle door. Improved automobile bodypanels which are composites of a metal panel and a laminated plastic sheet attached to the metal panel are disclosed in U.S. Pat. No. 4,830,908.

Energy absorbing structures suitable for use in a motor vehicle body panel are disclosed in U.S. Pat. No. 4,545,172. The panels have the ability to absorb impact loads in a longitudinal direction. They comprise a wall having a plurality of ridges extending in a longitudinal direction corresponding to the expected direction of an applied load. Such structures undergo progressive collapse under impact in the longitudinal direction. The assemblies are made of a metal such as aluminum.

In U.S. Pat. No. 4,034,137, there is disclosed composite resin sheet structures to provide light weight, high strength panels which can be of flat or curved construction for use in place of sheet steel for automotive vehicle bodies and body parts. These are improved laminated sheet structures comprising resilient open-celled resin foam impregnated with a thermosetting resin and compressed and bonded to surface layers of thermosetting resin-impregnated fibrous materials, such as fiberglass, matted or woven cloth Laminated sheet structures of this type are referred to in this patent as disclosed in U.S. Pat. Nos. 3,193,437; 3,192,441; and 3,944,707.

Improved composite structures are disclosed in U.S. Pat. No. 4,250,136. An amorphous or uncured core element is used which comprises a mixture of small and large organic (e.g. polystyrene or phenolic) or inorganic (e.g. clay, quartz, or glass) hollow spheres having diameters, for example, in the range of 10 to 15,000 microns and a wall thickness of 0.2 to 200 microns. Suitable matrices can be an organic resin such as an epoxy, a polyester, or a vinyl ester resin.

Energy absorbing materials which are composites useful in the manufacture of automobile bumpers and other devices intended to provide protection against damage due to impact, shock, or collision, are disclosed in U.S. Pat. No. 4,101,704. These composites utilize a polymer matrix which can be a polyurethane polymer having dispersed therein rigid, hollow bodies composed of a phenolic resin, glass, silica, or carbon.

A foam composite useful as an insulating board is disclosed in U.S. Pat. No. 4,877,671 as having a first and second oppositely disposed corrugated skin and a core of a foam material therebetween. The foam core is a phenolic foam.

A material for use as a reinforcing core in a structure is disclosed in U.S. Pat. No. 4,522,860. Reinforcing structures are also disclosed in U.S. Pat. Nos. 3,825,465, 3,376,684, 3,591,351 and 3,869,778.

In each of the composites disclosed in the prior art, improved resistance to lateral impact loads is desirable. The composite of the present invention provides for a novel structure which is specifically intended to provide improved resistance to lateral impact loads, as a consequence of the improved ability of the composite to transfer the impact load to adjacent areas so as to allow the composite to sequentially deform under load. The composite automobile body panels of the prior art, composed of a light weight plastic material, require substantially increased lateral impact resistance in order to replace the presently used sheet steel body panels.

SUMMARY OF THE INVENTION

It is an object of the present invention to provide a reinforcing core structure which is designed specifically to have improved resistance to lateral impact loads and especially to catastrophic failure. In order to obtain such improved resistance to lateral impact loads, the components of the composite of the invention are arranged such that upon lateral impact, impact load is distributed so as to cause sequential, or progressive deformation of the areas adjacent to the area of impact. The distribution of the impact load over a wide area of the composite reduces the likelihood of catastrophic failure of the composite. Thus the impact load is distributed from the external walls of the structure through an internal reinforcing core structure. Light weight, relatively low tensile strength materials can be used in the reinforcing structures of the invention. The composite can replace steel automobile body panels and can be used in aeronautical and marine vehicle applications as well as in homes, industrial buildings, and in the defense industry.

The improved lateral impact resistance of the composite of the invention upon subjection of the composite to a deforming impact force is obtained by arranging the reinforcing structure components of the composite so as to distribute the impact force over the area of the panel immediately surrounding the area of impact. Thus the action of a deforming impact force on the outer walls of the composite of the invention causes progressive deformation of the composite in the area adjacent to the deforming force. This result is, preferably, obtained in a composite having first and second opposing walls and contained therewithin, a reinforcing structure comprising at least one sheet member having undulations formed on a first and second series of intersecting parallel axes. Preferably, said parallel axes intersect at right angles. Most preferably, three undulating, reinforcing sheet members are used. Preferably, the trough and crests of an undulating reinforcing sheet member are in contact with the opposing walls of said composite so as to absorb lateral impact forces.

The undulating, reinforcing structures are formed, in one embodiment of the invention, by a process in which a fibrous planar sheet material is deformed by pressing. Alternatively, where the sheet is a metal or plastic, the reinforcing sheet member may be formed by molding, stamping, or casting. Where the reinforcing sheet member is formed of a fibrous material, the material is first impregnated with a thermoplastic or thermosetting resin and, subsequently, formed by pressing, optionally, using heated press platens. Light weight metals, such as aluminum, are preferred as a reinforcing sheet member.

The undulating, reinforcing structures can also be formed in another embodiment of the invention by forming a fibrous material in association with a plurality of foamed or non-foamed rigid, solid or hollow particulate, reinforcing members, preferably, having a spherical shape as depicted in one embodiment of the invention, in FIG. 1 and FIG. 2 of the drawing. Such spherical members can be utilized, when of appropriate particle size, not only as reinforcing members but also as alternatives to the use of the undulating, reinforcing members. These materials, when solid, may also contain fillers, and, preferably, said spherical bodies contain as fillers a plurality of rigid, hollow bodies composed of a mixture of small and large size spheres which can be organic such as polystyrene or phenolic or inorganic, for instance, ceramics such as quartz or glass spheres.

A matrix surrounding the undulating, reinforcing members or rigid solid or hollow bodies can be any suitable foamed or non-foamed, filled or non-filled, thermoplastic or thermosetting resin, such as polyvinyl chloride, polystyrene, polyacrylate, polyolefin, epoxy, phenolic, polyester, vinylester, or the like. The foam materials utilized can be, for instance, an organic foam, such as a phenolic, urea-formaldehyde, polyvinylchloride, polystyrene, or polyurethane foam.

BRIEF DESCRIPTION OF THE FIGURES

The above-mentioned objects and advantages of the present invention will be more clearly understood when considered in conjunction with the accompanying drawings, in which:

FIG. 1 is an exploded view of one embodiment of a laminated composite structure in accordance with the present invention in which an undulating, reinforcing member is formed around spherical bodies arranged on dual longitudinal axes.

FIG. 2 is an exploded view of one embodiment of a laminated composite structure in accordance with the present invention in which a composite is formed between the platens of a press.

FIG. 3 is a cross sectional view of one embodiment of a laminated composite structure in accordance with the present invention. The reinforcing, undulating members are formed around spherical bodies.

DETAILED DESCRIPTION OF THE INVENTION

Referring to the drawings and, more particularly, to FIG. 1 which is an exploded view of one embodiment of a laminated composite structure in accordance with the present invention, reference numeral 10 generally defines fibrous sheets which are utilized as external walls of the composite of the invention. Sandwiched between at least two of said fibrous sheets are undulating, reinforcing sheet members 18. Reinforcing member 18 is formed between dual planes of spherical bodies 14 arranged upon dual axes 16 and 22 each running in different directions and spaced apart by lattice structures 12.

Similarly, in FIG. 2, undulating, reinforcing members 18 are sandwiched between spherical bodies 14 and lattice structures 12 prior to forming the composite between press platens 24. A particular advantage of the structures of FIG. 1 and FIG. 2 is that a resistance to lateral impact loads as well as an overall strength increase is obtained for a composite utilizing said reinforcing members. This result is obtained in view of the fact that the alternating, longitudinally extending crests and troughs of undulating, reinforcing members 18 provide resistance to lateral impact loads as well as multiplanar torsional deformation. The reinforcing sheet members 18 contribute to the strength of the composite in a manner similar to that of a truss structure, as utilized in building and bridge construction. Impact loads applied normal to external walls 10 tend to be distributed widely over the external walls and composite internal structure as a result of the impact load distributing structure of the composite of the invention.

In FIG. 3, the composite of the invention is shown in cross section. External walls 10 enclose matrix 25 surrounding spherical, reinforcing bodies 14 upon which the undulating, reinforcing sheet members 18 are formed. The spacing lattice structures 12 may be inorganic or organic, such as a glass woven fabric or a metal or plastic mesh, such as a carbon fiber woven fabric. The spherical bodies are arranged on dual axes, preferably, by insertion on rods 16 and 22 which can be formed of any suitable material such as wood, metal, ceramics or plastic.

Woven or non-woven fibrous sheets can be utilized as external walls 10 in one embodiment of the invention or as reinforcing, undulating sheet members in the composite of the invention. These can be of an aromatic polyamide, for instance, Kevlar, fiberglass, polyethylene terephthalate, for instance, Dacron, or graphite fiber material. Suitable fibrous sheets can be pre-impregnated with a conventional thermoplastic or thermosetting plastic, for instance, a vinyl ester, i.e., polyvinyl chloride, polystyrene, polyacrylate, or, for instance, urea-formaldehyde or phenol-formaldehyde resinous materials, natural and synthetic rubbers, polyolefins, polydienes, polyurethanes, polyester and epoxy materials. These are available commercially. It is preferred to pre-impregnate the fibrous sheet with the same thermosetting resin as used to form the matrix which is in contact with the fibrous sheet external walls 10 and undulating, reinforcing members 18.

The undulating, reinforcing members 18 are formed on a molding means of any deformable sheet material. Preferably, the reinforcing members 18 are fibrous sheets or metal or plastic sheets. Metals which are easily formed into undulating form without fracture, such as aluminum are preferred. Thermoplastic sheets can be formed of polyvinyl chloride, polystyrene, polyacrylate or polyurethane plastics. Foamed plastic sheets formed from open or closed cell foams are also useful.

Subsequent to assembling the composite of the invention between the walls of the composite within a matrix of a thermosetting or thermoplastic resin, the impregnated fibrous sheet walls are, preferably, bonded to the internal reinforcing members. This can be accomplished, generally, by the application of heat and pressure. As indicated above, the reinforcing member when a fibrous material can be impregnated, for instance, with phenolic, polyvinyl chloride, polyacrylate, polystyrene, polyolefin, urea-formaldehyde, polyurethane, or epoxy thermoplastic or thermosetting materials prior to assembling the composite.

The external walls of the composite of the invention which are resistant to abrasion and weathering can be a fibrous organic or inorganic material. Preferably, the external walls are composed of wood, metal, or a thermoplastic or thermosetting material. The internally disposed surfaces of the external walls are, preferably, bonded to fibrous sheet reinforcing members, preferably, utilizing as a polymer matrix material the same thermosetting or thermoplastic polymer as is utilized to impregnate the fibrous sheets which are used in the fabrication of the external walls of the composite. When the external walls of the composite are made of a thermoplastic material, it is preferred to use polyvinyl chloride, polyolefins, polydienes, and polyurethanes as matrix materials. When the external walls of the composite are made of a thermosetting material, it is preferred to utilize as the polymer matrix material a thermosetting polyester, a polyurethane, a cross-linked synthetic or natural rubber, epoxy, or phenol-formaldehyde material which can be a non-foamed or foamed material. Alternatively, it is also desirable to utilize a light weight metal external wall material, such as aluminum, or wood or an impact resistant plastic sheet. Useful fibrous sheet reinforcing members are, preferably, selected from the group consisting of fiberglass, carbon fiber, Kevlar, and Dacron.

Hollow or solid rigid spheres are preferred as a particulate filler material within the matrix of the composite. The preferred hollow or solid particulate spheres are, generally, utilized as fillers in admixture with a continuous phase thermoplastic or thermosetting resin. This mixture can be utilized to fill spaces between the undulating, reinforcing member and the walls of the composite. The hollow or solid spheres can be of either organic or inorganic material. The spheres can be macro or micro spheres and range in size between about the thickness of the space between the external walls of the composite to fine particle size powders. Such macro spheres can be used above as reinforcing structures instead of or as well as in combination with undulating, reinforcing, sheet materials. Preferably, said macro spheres have a diameter up to about the thickness of the space between the walls of the composite, most preferably, said macro spheres have a diameter of about the thickness of the space between the walls of the composite. Typical useful polymeric materials are phenol-formaldehyde, urea-formaldehyde, polyester, polyurethane, polyepoxide, or polystyrene resins. Inorganic spherical materials are, generally, preferred. These are, generally, composed of ceramics such as silicate or glass. The spheres can also be made of carbon. The smaller size hollow spheres or beads are sometimes referred to as micro-balloons. Such spheres can have a diameter of 10-200 microns and a wall thickness of from 0.5 to 2.0 microns. Larger spheres are also available. These are known as macro-spheres or macro-balloons. These have a diameter of about 500-15,000 microns and a wall thickness of about of 100-200 microns.

The number of spheres which are mixed with the continuous phase thermoplastic or thermosetting resin is, generally, referred to as the loading volume. The greater the loading volume or number of spheres, the less the density of the composite. While density decreases with increased loading volumes, it is also to be noted that the tensile strength of the filled, resin material utilized as a matrix and/or to fill the hollow spherical members also decreases as the total sphere filler volume increases. Similarly, the viscosity of a mixture of uncured resin and spheres increases with higher sphere filler loading volumes. Thus, with low loading volumes, the liquid resin and sphere mixture will have a low viscosity and thus is characterized as easily pourable. Spheres of differing sizes are generally, mixed with the thermosetting or thermoplastic resin to increase the loading volume and thereby reduce the density. The spheres normally contain trapped air or other gases.

To maximize the hollow sphere filler loading of the continuous phase matrix thermosetting or thermoplastic resin so as to reduce the weight of the matrix material, it is preferred to utilize a mixture of varying size spheres. In addition, it is preferred that the proportion of macro-spheres to micro-spheres be in the volume ratio of about 3 or 4:1.

Conventional thermoplastic and thermosetting resins can be utilized both as the continuous phase matrix in combination with the macro- and micro-spheres or beads and to bond the fibrous or metal undulating, reinforcing members with the wall members of the composite of the invention. Illustrative of suitable thermoplastic resin matrix materials are polyvinyl chloride, polystyrene, polyacrylate, and polyolefin. Suitable representative thermosetting resin matrix materials include urea-formaldehyde, phenol-formaldehyde, epoxy resins, polyester resins, etc. These thermosetting resins are available in liquid form. They polymerize upon the application of heat or the addition of a copolymerizable component and/or a catalyst for the polymerization.

Suitable organic sheet materials for use as impact resistant external wall members of the composite of the invention include polyvinylchloride, synthetic and natural rubbers, polyolefins, and polydienes, but, preferably, the outer skin is formed from a fibrous material impregnated with a polyester or a polyurethane polymer. Suitable polyurethane polymers for use in the formation of the external walls of the composite of the invention are disclosed in U.S. Pat. No. 4,101,704, incorporated herein by reference.

While this invention has been described with reference to certain specific embodiments, it will be recognized by those skilled in the art that many variations are possible without departing from the scope and spirit of the invention and it will be understood that it is intended to cover all changes and modifications of the invention disclosed herein for the purposes of illustration which do not constitute departures from the spirit and scope of the invention.

The invention in which an exclusive property or privilege is claimed is defined as follows:

1. A reinforcing core structure useful in the formation of an energy absorbing composite having external walls, said reinforcing core structure comprising:
    a polymer matrix; a plurality of particulate, reinforcing members;
    and an undulating, reinforcing, sheet member having longitudinally spaced, alternating crests and troughs which are formed on a molding means having a first and second series of intersecting parallel axes and
    wherein said particulate, reinforcing members have a diameter up to about the thickness of the space between the walls of said composite.

2. The reinforcing core structure of claim 1 wherein said undulating, reinforcing, sheet member having longitudinally spaced, alternating crests and troughs is formed on a molding means, said molding means having said first series of parallel axes which are at right angles to said second series of parallel axes and wherein said particulate, reinforcing members are about the thickness of the space between the external walls of said composite.

3. The reinforcing structure of claim 2 wherein said undulating, reinforcing, sheet member is formed of any deformable sheet material on said molding means from a metal, a fibrous or a plastic sheet member.

4. The reinforcing structure of claim 2 wherein said undulating reinforcing, sheet member is formed from a fibrous material impregnated with a thermoplastic or thermosetting polymer and formed in association with a plurality of rigid, solid or hollow, particulate bodies.

5. The reinforcing structure of claim 4 wherein said rigid, solid or hollow, particulate bodies are spherical.

6. The reinforcing structure of claim 4 wherein said fibrous material comprises a fiber selected from the group consisting of fiberglass, graphite fiber, aromatic polyamide fiber, and polyethylene terephthalate fiber and said thermoplastic or thermosetting polymer is selected from the group consisting of a vinylester, a polyester, an epoxy, a synthetic rubber a natural rubber, a polyolefin, a polydiene, a phenol-formaldehyde polymer, a urea-formaldehyde polymer, and a polyurethane.

7. An energy absorbing composite comprising first and second oppositely disposed, external walls and a reinforcing, core structure comprising
    a polymer matrix; a plurality of particulate, reinforcing members having a diameter up to about the thickness of the space between the walls of said composite;
    and an undulating, reinforcing, sheet member having longitudinally spaced, alternating crests and troughs which are formed on a molding means having a first and second series of intersecting parallel axes and
    wherein under the action of a deforming impact force on said walls, progressive deformation of said composite takes place in the area adjacent to said deforming force.

8. The energy absorbing composite of claim 7 wherein said undulating, reinforcing, sheet member having longitudinally spaced, alternating crests and troughs is formed on a molding means having said first and second series of intersecting parallel axes which are at right angles wherein said particulate, reinforcing members are about the thickness of the space between said external walls of said composite and said polymer matrix comprises a thermoplastic or thermosetting polymer.

9. The composite of claim 8 wherein said external walls are selected from the group consisting of metal, fibrous materials, and plastic, said particulate, reinforcing members are spherical, and said undulating, reinforcing sheet member comprises a woven or non-woven fibrous material.

10. The composite of claim 9 wherein said thermoplastic or thermosetting polymer matrix comprises a polymer selected from the group consisting of polyester, epoxy, phenol-formaldehyde, a cross-linked synthetic or natural rubber, polyolefins, polydienes, and polyurethane and said external walls comprise a fibrous material selected from the group consisting of fiberglass, carbon fiber, aromatic polyamide fiber, and polyethylene terephthalate.

11. The composite of claim 10 wherein said undulating, reinforcing, sheet member is formed in association with a plurality of said spherical, reinforcing members consisting of substantially unbroken, rigid, hollow or solid bodies.

12. The composite of claim 11 wherein said spherical reinforcing members are of a material selected from the group consisting of phenol-formaldehyde, urea-formaldehyde, glass, silicate, polyester, polyepoxide, polyurethane, polystyrene, and carbon.

13. The composite of claim 12 wherein said spherical reinforcing members are hollow, said polymer matrix is a rigid foam or non-foam matrix selected from the group consisting of phenol-formaldehyde polymer, a urea-formaldehyde polymer, a vinyl ester polymer, a polyester, a polyurethane polymer, and an epoxy polymer.

14. The composite of claim 12 wherein said spherical bodies are foamed and said polymer matrix is a rigid, polymer foam selected from the group consisting of a phenol-formaldehyde foam and a polyester foam.

15. The composite of claim 14 wherein said matrix comprises a phenol-formaldehyde polymer foam and a filler consisting of a mixture of phenol-formaldehyde micro- and macro-balloons.

* * * * *